United States Patent [19]

Robyn et al.

[11] Patent Number: 4,792,468
[45] Date of Patent: Dec. 20, 1988

[54] METHOD OF FORMING REFRACTORY MASSES FROM COMPOSITIONS OF MATTER OF SPECIFIED GRANULOMETRY

[75] Inventors: Pierre Robyn, Nivelles; Léon-Philippe Mottet, Tarcienne; Pierre Deschepper, Marcinelle, all of Belgium

[73] Assignee: Glaverbel, Brussels, Belgium

[21] Appl. No.: 803,782

[22] Filed: Dec. 2, 1985

[30] Foreign Application Priority Data

Jan. 26, 1985 [GB] United Kingdom ............... 8502008

[51] Int. Cl.⁴ .................. C04B 35/02; C04B 35/60; C04B 35/62
[52] U.S. Cl. .................................. 427/422; 264/30; 264/65; 264/332; 427/427; 501/94
[58] Field of Search .................. 264/30, 82, 332, 65, 264/66; 501/103, 106, 108, 127, 128, 133, 94; 427/427, 236, 376.1, 422

[56] References Cited

U.S. PATENT DOCUMENTS

| | | | |
|---|---|---|---|
| 3,333,971 | 8/1967 | McKenna | 264/30 |
| 3,343,915 | 9/1967 | Rossi et al. | 264/332 |
| 3,544,666 | 12/1970 | Shiota et al. | 264/66 |
| 3,591,668 | 7/1971 | Kirchner et al. | 264/66 X |
| 3,615,778 | 10/1971 | Albert | 264/66 X |
| 3,666,851 | 5/1972 | Chaklader | 264/66 |
| 3,684,560 | 8/1972 | Brichard et al. | 501/103 |
| 3,698,922 | 10/1972 | Staut | 264/66 |
| 3,708,317 | 1/1973 | Owen et al. | 264/66 X |
| 3,715,220 | 2/1973 | Confer et al. | 264/66 X |
| 3,800,983 | 6/1972 | Birchard et al. | 222/52 |
| 3,900,542 | 8/1975 | Palmour et al. | 264/66 X |
| 4,125,407 | 11/1978 | Ueno | 501/127 |
| 4,222,782 | 9/1980 | Alliegro et al. | 501/108 |
| 4,222,978 | 9/1980 | Oda et al. | 264/66 X |
| 4,344,904 | 8/1982 | Yamada et al. | 264/66 |
| 4,400,335 | 8/1983 | Ivarsson et al. | 264/30 |
| 4,416,999 | 11/1983 | Hiromi et al. | 501/127 |
| 4,427,785 | 1/1984 | Prochazka et al. | 264/65 |
| 4,489,022 | 12/1984 | Robyn et al. | 264/30 |
| 4,503,093 | 3/1985 | Iseli et al. | 427/427 |
| 4,542,888 | 9/1985 | Robyn et al. | 264/30 |

FOREIGN PATENT DOCUMENTS 1330895 9/1973 United Kingdom .

Primary Examiner—Jan H. Silbaugh
Assistant Examiner—Karen D. Kutach
Attorney, Agent, or Firm—Spencer & Frank

[57] ABSTRACT

A process of forming a refractory mass on a surface, which process includes spraying against that surface a mixture of refractory particles and oxidisable particles which react exothermically with oxygen to generate sufficient heat to soften or melt at least the surfaces of the refractory particles and so bring about formation of said refractory mass, and causing the sprayed mixture to be heated sufficiently to cause the oxidisable particles to undergo such exothermic reaction, the granulometry of the particles which are sprayed in the mixture being such that the mean of the 80% and 20% grain sizes of the refractory particles is greater than the mean of the 80% and 20% grain sizes of the oxidisable particles and that the size range spread factor of the refractory particles is at least 1.2.

16 Claims, 1 Drawing Sheet

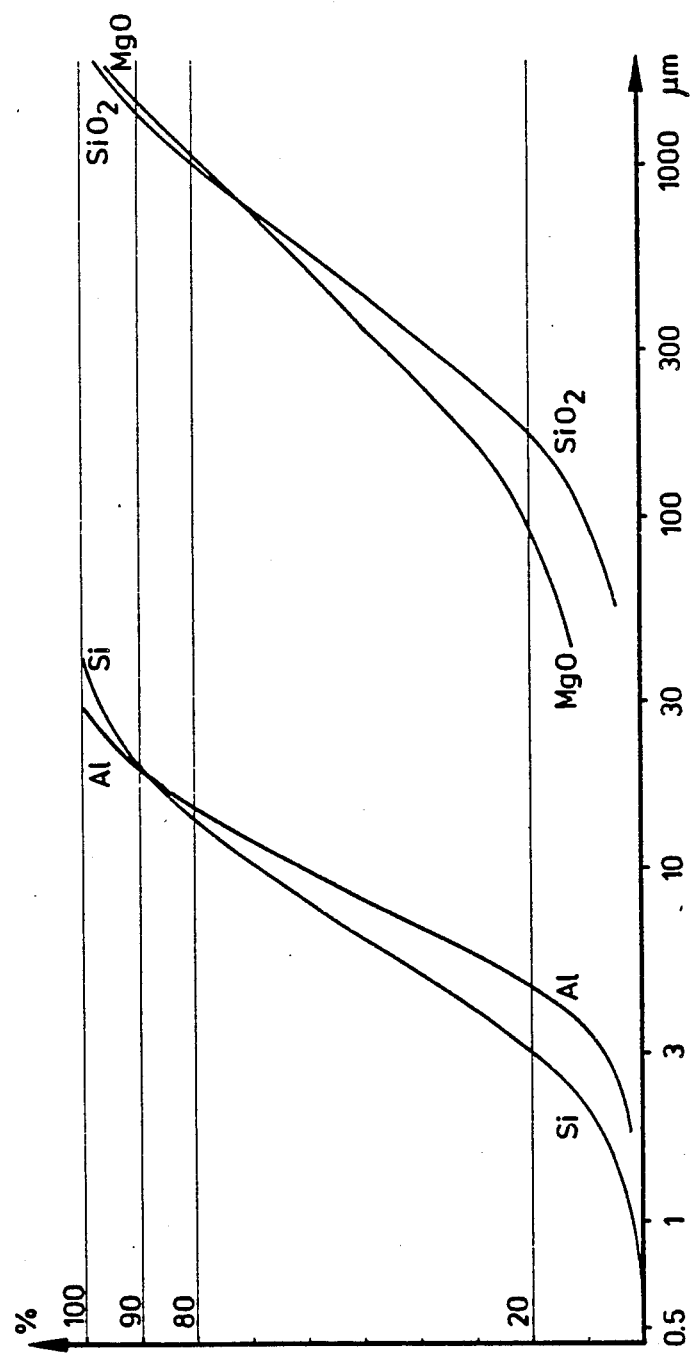

METHOD OF FORMING REFRACTORY MASSES FROM COMPOSITIONS OF MATTER OF SPECIFIED GRANULOMETRY

This invention relates to a process of forming a refractory mass on a surface, which process comprises spraying against that surface a mixture of refractory particles and oxidisable particles which react exothermically with oxygen to generate sufficient heat to soften or melt at least the surfaces of the refractory particles and so bring about formation of said refractory mass.

This invention also relates to a composition of matter for spraying against a surface to form a refractory mass, such composition being a mixture comprising refractory particles, together with particles of exothermically oxidisable material.

Processes of the kind referred to are particularly suitable for the hot repair of furnaces and other refractory devices. They are also useful in the formation of refractory components, for example for the surfacing of refractory metals or other refractory substrates, and in particular for the formation of refractory linings on parts which are especially susceptible to erosion. In the case of furnace repair, such processes can be, and indeed preferably are, operated substantially at the working temperature of the furnace. In addition, in some cases, for example the repair of a glass melting furnace superstructure, repair can be effected while the furnace is still operating.

It is important that the refractory mass formed should be of a high quality so that it will have a long useful working life. It has been found that the ability of such a mass to resist erosion and other stresses, in particular thermal stresses, to which it is likely to be subjected during its working life is dependent not only on its composition, but also on its structure, and that the structure of the refractory mass is strongly influenced by the way the mass forms from the sprayed material.

It is an object of the present invention to provide a new process of forming a refractory mass on a surface, which process provides certain advantages as will hereinafter be adverted to.

According to the present invention, there is provided a process of forming a refractory mass on a surface, which process comprises spraying against that surface a mixture of refractory particles and oxidisable particles which react exothermically with oxygen to generate sufficient heat to soften or melt at least the surfaces of the refractory particles and so bring about formation of said refractory mass, characterised in that the granulometry of the particles which are sprayed in the mixture is such that the mean of the 80% and 20% grain sizes of the refractory particles is greater than the mean of the 80% and 20% grain sizes of the oxidisable particles and that the size range spread factor (as herein defined) of the refractory particles is at least 1.2.

The expression "% grain size" used herein in relation to particles of material denotes that that % proportion by weight of the particles will pass a screen having a mesh of that size, and references to the mean of two grain sizes are references to half the sum of those grain sizes.

The expression "size range spread factor" [f(G)] is used herein in respect of a given species of particles to denote the factor:

$$f(G) = \frac{2(G_{80} - G_{20})}{G_{80} + G_{20}}$$

where $G_{80}$ denotes the 80% grain size of the particles of that species, and $G_{20}$ denotes the 20% grain size of the particles of that species.

In general, samples of particles of a given material have a size range distribution which follows a bell curve, and when the cumulative distribution, that is the proportion by weight which will pass a screen having a mesh of a given size, is plotted on a linear scale against the screen mesh size plotted on a logarithmic scale, the result is a sigmoid curve which is generally straight between the points which correspond to the 80% and 20% grain sizes of the particles under test.

It has been found that the observance of the specified conditions in respect of the granulometry of the sprayed particles promotes the reliability and consistency with which highly durable refractory deposits can be formed under given process conditions. It is extremely surprising that the granulometry of the sprayed particles should have such an effect on the quality of the refractory product, particularly since it has been found that this advantage accrues even when the process is performed under conditions such that the refractory particles sprayed become completely melted. The reliable and consistent formation of a durable refractory mass by the adoption of a process according to this invention is attributed to a tendency for that refractory product to be comparatively less porous and comparatively free from cracks with respect to a refractory product formed by a process in which the said particle granulometry conditions are not observed but which is otherwise similar. The high size range spread factor presumably contributes to this result, but it has been found that reliance on that factor alone is not sufficient to give good results. Notwithstanding the wide size range spread of the refractory particles, it has been found that the oxidisable particles must be of a lower mean size (as hereinbefore defined), or the advantage referred to pertaining to the quality of the refractory masses formed by the process will not be achieved. It will be appreciated that for any given proportion of oxidisable particles of a given composition present in the mixture, the number of such particles present will vary inversely with the cube of their mean size. It is important to have a large number of such particles present to allow direct radiant heating of substantially all the refractory particles during spraying.

In preferred embodiments of the invention, the mean of the 80% and 20% grain sizes of the refractory particles is not greater than 2.5 mm. The adoption of this condition favours the smooth progression of the process as regards the particle supply to and flow through the lance. In order further to promote this smooth operation it is particularly preferred that the 90% grain size of the refractory particles is not greater than 4 mm.

Advantageously, the mean of the 80% and 20% grain sizes of the refractory particles is not greater than 1 mm, and the 90% grain size of the refractory particles is not greater than 2 mm. Not only does the adoption of this feature yet further promote smooth operation, but also, it has been found that if larger particles are used, they occasionally tend to rebound from a surface against which they are sprayed so reducing the amount of material deposited to form a refractory mass. This is especially so when the particles are sprayed against an overhead surface. By keeping the mean of the 80% and 20% grain sizes of the refractory particles and their 90% grain size down to those values, this tendency is much reduced.

Advantageously, the mean of the 80% and 20% grain sizes of the refractory particles is at least 50 μm. The adoption of this preferred feature helps to avoid smothering of the oxidation reactions which take place during spraying of the mixture, by refractory particles which are too small.

Preferably, the size range spread factor (as herein defined) of the refractory particles is at least 1.3. This further promotes a reduction in porosity of a refractory product formed on spraying of the mixture.

Advantageously, the size range spread factor (as herein defined) of the refractory particles is not greater than 1.9. This condition is beneficial for reducing segregation of different sizes of refractory particles by settling during storing or handling, for example during feed to the lance.

In preferred embodiments of the invention, the size range spread factor (as herein defined) of the oxidisable particles is not greater than 1.4. As contrasted with the size range spread factor of the refractory component of the mixture, a high size range spread factor for the oxidisable particles is not to be sought after as it militates against the uniformity of the oxidation reactions which is desirable for the formation of a high quality refractory mass. The size range spread factor (as herein defined) of the oxidisable particles may for example be 1.3 or less.

Advantageously, the mean of the 80% and 20% grain sizes of the oxidisable particles is not greater than 50 μm. Particles of such grain sizes are easily oxidised, so promoting rapid evolution of heat during spraying of the mixture.

Such rapid oxidation and evolution of heat during spraying is further promoted when, as is preferred, the 90% grain size of the oxidisable particles is not greater than 50% μm.

In order further to promote rapid oxidation, it is preferred that the mean of the 80% and 20% grain sizes of the oxidisable particles is not greater than 15 μm. The adoption of this preferred feature enables the oxidation reactions to proceed sufficiently rapidly to ensure substantially complete combustion of the oxidisable particles without adding unnecessarily to the cost of the starting materials.

Incombustible particles of various compositions can be used in the present invention, depending of course on the required composition of the refractory mass to be deposited on spraying of the mixture. In general, for compatibility between such a refractory deposit and a surface of a refractory substrate on which it is formed and to which it is to remain adherent, it is desirable that the deposit should include material having a similar chemical composition to material included in the substrate. Problems which can arise if this general guideline is not followed may be due to chemical incompatibility between the deposit and the substrate, or to a wide difference between their coefficients of thermal expansion which could lead to excessive thermal stress at their boundary and flaking off of the deposited refractory mass. The most useful materials for forming said refractory particles comprise one or more of sillimanite, mullite, zircon, $SiO_2$, $ZrO_2$, $Al_2O_3$, MgO.

Preferably, at least some of the refractory material has previously been fired to a temperature in excess of 0.7 times its melting point expressed in kelvins. Such a heat treatment has a beneficial effect on various refractory materials for promoting the formation of a high quality refractory deposit. In the case of some materials, such as magnesia, such a heat treatment drives off any molecular water bound in that material. In the case of other materials, for example silica, such a heat treatment favourably alters the crystallographic structure for the purpose in view.

When the refractory material comprises particles of silica, it has been found that the mineralogical form of the silica has an important effect on the form of the silica incorporated in a refractory mass formed by spraying the mixture, notwithstanding that the silica may have been completely melted during such spraying. Preferably, at least 90% by weight of any silica present in said refractory material of said mixture is in the form of tridymite and/or cristobalite, as this gives the best results.

Indeed, it has been found in general that the crystallographic structure of the refractory product formed by a process according to this invention is strongly influenced, if not even determined, by the form and size of the material sprayed. It is assumed that even if the refractory particles sprayed do become completely melted, some crystallites remain in the fluid state to influence the way in which recrystallisation takes place on subsequent solidification.

Advantageously, said oxidisable particles comprise particles of one or more of silicon, aluminium, magnesium and zirconium. Particles of such materials can be oxidised rapidly with a high accompanying evolution of heat and themselves form refractory oxides, and are thus very suitable for use in the present invention.

For economic reasons, it is preferred that said oxidisable particles are present in an amount not exceeding 20% by weight of said mixture. There is also a technical reason for that limit, in that if greater proportions of oxidisable material are used, the working surface may be liable to overheat.

The present invention also provides a composition of matter for spraying against a surface to form a refractory mass, such composition being a mixture comprising refractory particles, together with particles of exothermically oxidisable material, characterised in that the exothermically oxidisable particles are present in an amount between 5% and 30% by weight of said mixture and the granulometry of said particles is such that the mean of the 80% and 20% grain sizes of the refractory particles is greater than the mean of the 80% and 20% grain sizes of the oxidisable particles and that the size range spread factor (as herein defined) of the refractory particles is at least 1.2.

Such a composition contributes to the facility with which durable refractory masses can be formed by causing combustion of the oxidisable particles during spraying, and the latitude allowed for the grain size range spread of the refractory particles has a favourable effect on the production costs of the composition. The said mixture can be formed using refractory particles which are readily obtainable by an appropriate selection of sizing operations.

Advantageously, the mean of the 80% and 20% grain sizes of the refractory particles is not greater than 2.5 mm. The adoption of this condition is favourable for smooth feed of the particles to and through a lance which is to be used for spraying the particles. In order further to promote this smooth feed it is particularly preferred that the 90% grain size of the refractory particles is not greater than 4 mm.

Preferably, the mean of the 80% and 20% grain sizes of the refractory particles is not greater than 1 mm, and the 90% grain size of the refractory particles is not greater than 2 mm. Not only does the adoption of this feature yet further promote smooth feed of the particles, but also, it has been found that if larger particles are used, they occasionally tend to rebound when they are sprayed against a surface, so reducing the amount of material which would be deposited to form a refractory mass. This is especially so when the particles are to be sprayed against an overhead surface. By keeping the mean of the 80% and 20% grain sizes of the refractory particles and their 90% grain size down to those values, this tendency is much reduced.

Advantageously, the mean of the 80% and 20% grain sizes of the refractory particles is at least 50 $\mu$m. The adoption of this preferred feature helps to avoid smothering of the oxidation reactions which take place when the mixture is sprayed, by refractory particles which are too small.

Preferably, the size range spread factor (as herein defined) of the refractory particles is at least 1.3. This further promotes a reduction in porosity of a refractory formed when the mixture is sprayed.

Advantageously, the size range spread factor (as herein defined) of the refractory particles is not greater than 1.9. This limits the size range spread of those particles so that a given sample will have a relatively low proportion of particles which are either comparatively very small or very large. The adoption of this feature gives a reduced tendency for the particles to segregate by settling during transport from place to place or even while they are contained in a hopper of a spraying machine.

The FIGURE represents a graph of the cumulative distribution of various species of particles used in the compositions.

In preferred embodiments of the invention, the size range spread factor (as herein defined) of the oxidisable particles is not greater than 1.4. As contrasted with the size range spread factor of the refractory component of the mixture, a high size range spread factor for the oxidisable particles is not to be sought after as it militates against the uniformity of the oxidation reactions which is desirable for the formation of a high quality refractory mass when the mixture is sprayed. The size range spread factor (as herein defined) of the oxidisable particles may for example be 1.3 or less.

Advantageously, the mean of the 80% and 20% grain sizes of the oxidisable particles is not greater than 50 μm. Particles of such grain sizes are easily oxidised, so promoting rapid evolution of heat when the mixture is sprayed.

Such rapid oxidation and evolution of heat when the mixture is sprayed is further promoted when, as is preferred, the 90% grain size of the oxidisable particles is not greater than 50 μm.

In order further to promote rapid oxidation, it is preferred that the mean of the 80% and 20% grain sizes of the oxidisable particles is not greater than 15 μm. The adoption of this preferred feature enables the oxidation reactions which take place when the mixture is sprayed to proceed sufficiently rapidly to ensure substantially complete combustion of the oxidisable particles without adding unnecessarily to the cost of the starting materials.

Incombustible particles of various compositions can be used in the present invention, depending of course on the required composition of the refractory mass to be deposited on spraying of the mixture. In general, for compatibility between such a refractory deposit and a surface of a refractory substrate on which it is to be deposited and to which it is to remain adherent, it is desirable that the deposit should include material having a similar chemical composition to material included in the substrate. Problems which can arise if this general guideline is not followed may be due to chemical incompatibility between the deposit and the substrate, or to a wide difference between their coefficients of thermal expansion which could lead to excessive thermal stress at their boundary and flaking off of the deposited refractory mass. The most useful materials for forming said refractory particles comprise one or more of sillimanite, mullite, zircon, $SiO_2$, $ZrO_2$, $Al_2O_3$, MgO.

Preferably, at least some of the refractory material has previously been fired to a temperature in excess of 0.7 times its melting point expressed in kelvins. Such a heat treatment has a beneficial effect on various refractory materials for promoting the formation of a high quality refractory deposit when the mixture is sprayed. In the case of some materials, such as magnesia, such a heat treatment drives off any molecular water bound in that material. In the case of other materials, for example silica, such a heat treatment favourably alters the crystallographic structure for the purpose in view. The refractory particles can readily be obtained by an appropriate selection of sizing operations.

When the refractory material comprises particles of silica, it has been found that the mineralogical form of the silica has an important effect on the form of the silica incorporated in a refractory mass formed by spraying the mixture, notwithstanding that the silica may have been completely melted during such spraying. For the best results, it has been found that at least 90% by weight of any silica present in said refractory material of said mixture should be in the form of tridymite and/or cristobalite, as is preferred.

Indeed, it has been found in general that the crystallographic structure of the refractory product formed by a process according to this invention is strongly influenced, if not even determined, by the form and size of the material sprayed. It is assumed that even if the refractory particles sprayed do become completely melted, some crystallites remain in the fluid state to influence the way in which recrystallisation takes place on subsequent solidification.

Advantageously, said oxidisable particles comprise particles of one or more of silicon, aluminium, magnesium and zirconium. Particles of such materials can be oxidised rapidly with a high accompanying evolution of heat and themselves form refractory oxides, and are thus very suitable for use in the present invention.

For economic reasons, it is preferred that said oxidisable particles are present in an amount not exceeding 20% by weight of said mixture.

The following are some examples of processes and compositions of matter according to the invention.

In Examples 1 and 2, reference will also be made to the accompanying drawing which shows a graph of the cumulative distribution of various species of particles used, that is the proportion by weight which will pass a screen having a mesh of a given size, in which the cumulative proportion is plotted on a linear scale against the screen mesh size plotted on a logarithmic scale.

EXAMPLE 1

A mixture of particles was prepared comprising by weight 20% silicon and 80% silica. The silica was obtained by crushing bricks made from quartz sand which had previously been fired at a temperature of at least 1400° C. Due to the firing, two parts by weight of the silica were in the form of tridymite and three parts by weight were in the form of cristobalite.

Cumulative size range distribution graphs of the silicon and silica used are shown in the accompanying drawing.

The granulometry of the various particles is also given in the following table in which $G_{20}$, $G_{80}$ and $G_{90}$ respectively are the 20%, 80% and 90% grain sizes of the particles and f(G) is their size range spread factor as herein defined.

| Material | $G_{20}$ μm | $G_{80}$ μm | $G_{90}$ μm | f(G) |
|---|---|---|---|---|
| Si | 3 | 14 | 19.5 | 1.29 |
| SiO$_2$ | 170 | 1020 | 1450 | 1.43 |

The mixture of particles was projected at a rate of 1 kg/min in a stream of oxygen delivered at 200 L/min using apparatus as described in British patent specification No. 1,330,895 to form a uniform adherent refractory coating on a silica furnace wall which was at a temperature of 1200° C. to 1250° C. The use of the mixture led to the formation of substantially crack-free refractory coatings which adhered very well to the working surface. In addition, it was found that the boundary between the deposited coating and the original wall was substantially crack-free even when the coating was deposited to a thickness of 5 cm or more. The presence of boundary cracks is a particular problem when depositing silica coatings on silica walls. By way of comparison it has been found that when a mixture which did not have a granulometry in accordance with this invention was sprayed by a similar method, even when the coating thickness was as low as 1 cm, cracks were present both in the coating layer itself and at its boundary with the working surface of the wall.

The particulate refractory material substituted into the starting mixture for the purposes of this comparison was natural quartz sand having the following granulometry.

| Material | $G_{20}$ μm | $G_{80}$ μm | $G_{90}$ μm | f(G) |
|---|---|---|---|---|
| Quartz sand | 55 | 190 | 250 | 1.1 |

EXAMPLE 2

A mixture of particles was prepared comprising by weight 8% silicon, 4% aluminium and 88% magnesia. The magnesia used was natural magnesia which had been fired at 1900° C. in order to dehydrate it.

The silicon used had the granulometry specified in Example 1. Cumulative size range distribution graphs of the aluminium and magnesia used are also shown in the accompanying drawing.

The granulometry of the various particles is also given in the following table.

| Material | $G_{20}$ μm | $G_{80}$ μm | $G_{90}$ μm | f(G) |
|---|---|---|---|---|
| Si | 3 | 14 | 19.5 | 1.29 |
| Al | 4.6 | 15 | 19.5 | 1.06 |
| Si + Al | 3.5 | 14.4 | 19.5 | 1.22 |
| MgO | 90 | 1110 | 1500 | 1.7 |

The mixture of particles was projected using the same apparatus as in Example 1, to form a uniform refractory coating on a furnace wall which built up of basic refractory blocks mainly consisting of magnesia and which was at a temperature in excess of 1000° C. The use of the mixture led to the formation of low-porosity refractory coatings which adhered very well to the working surface.

EXAMPLE 3

A mixture of particles was prepared comprising by weight 6% silicon, 6% aluminium and 88% zircon/zirconia and alumina. The refractory particles were obtained by crushing used or broken electrocast refractory blocks of the type available under the Trade Mark "Corhart Zac". The approximate composition by weight of those blocks was: Al$_2$O$_3$ 65–75%; ZrO$_2$ 15–20%; SiO$_2$ 8–12%.

The silicon, aluminium and refractory particles had the following granulometry:

| Material | $G_{20}$ μm | $G_{80}$ μm | $G_{90}$ μm | f(G) |
|---|---|---|---|---|
| Si | 3 | 14 | 19.5 | 1.29 |
| Al | 4.6 | 15 | 19.5 | 1.06 |
| Si + Al | 3.6 | 14.8 | 19.5 | 1.21 |
| Refractory | 52.5 | 248 | ~330 | 1.3 |

This starting mixture was projected using the same apparatus as in the previous Examples onto an aluminous refractory wall to deposit substantially crack-free, low porosity coatings.

We claim:

1. A process of forming a substantially crack-free refractory mass on a surface, which process comprises spraying against the surface a mixture of refractory particles and oxidisable particles which react exothermically with oxygen to generate sufficient heat to soften or melt at least the surfaces of the refractory particles and so bring about formation of the refractory mass, and causing the sprayed mixture to be heated sufficiently to cause the oxidisable particles to undergo such exothermic reaction, characterised in that the granulometry of the particles which are sprayed in the mixture is such that the mixture has refractory and oxidizable particles of 80% grain size and of 20% grain size, the mean of the 80% and 20% grain sizes of the refractory particles is greater that the mean of the 80% and 20% grain sizes of the oxidisable particles and that the size range spread factor of the refractory particles is at least 1.2, the size range spread factor of the refractory particles being equal to:

$$\frac{2(G_{80} - G_{20})}{G_{80} + G_{20}},$$

where $G_{80}$ is the 80% grain size of the refractory particles, and $G_{20}$ is the 20% grain size of the refractory particles.

2. A process according to claim 1, wherein the 90% grain size of the refractory particles is not greater than 4 mm.

3. A process according to claim 1, wherein the mean of the 80% and 20% grain sizes of the refractory particles is at least 50 μm.

4. A process according to claim 1, wherein the size range spread factor of the refractory particles is at least 1.3.

5. A process according to claim 1, wherein the size range spread factor of the refractory particles is not greater than 1.9.

6. A process according to claim 1, wherein the size range spread factor of the oxidisable particles is not greater than 1.4.

7. A process according to claim 1, wherein the refractory particles comprise one or more of sillimanite, mullite, zircon, $SiO_2$, $ZrO_2$, $Al_2O_3$, MgO.

8. A process according to claim 1, wherein at least some of the refractory material has previously been fired to a temperature in excess of 0.7 times its melting point expressed in kelvins.

9. A process according to claim 1, wherein said refractory material includes silica and at least 90% by weight of the silica present in said refractory material of said mixture is in the form of tridymite and/or cristobalite.

10. A process according to claim 1, wherein said oxidisable particles comprise particles of one or more of silicon, aluminium, magnesium and zirconium.

11. A process according to claim 1, wherein said oxidisable particles are present in an amount not exceeding 20% by weight of said mixture.

12. A process according to claim 1, wherein the mean of the 80% and 20% grain sizes of the refractory particles is not greater than 2.5 mm.

13. A process according to claim 12, wherein the mean of the 80% and 20% grain sizes of the refractory particles is not greater than 1 mm, and the 90% grain size of the refractory particles is not greater than 2 mm.

14. A process according to claim 1, wherein the mean of the 80% and 20% grain sizes of the oxidisable particles is not greater than 50 μm.

15. A process according to claim 14, wherein the 90% grain size of the oxidisable particles is not greater than 50 μm.

16. A process according to claim 14, wherein the mean of the 80% and 20% grain sizes of the oxidisable particles is not greater than 15 μm.

* * * * *